United States Patent
Kodama et al.

(10) Patent No.: US 9,081,565 B2
(45) Date of Patent: Jul. 14, 2015

(54) COMMUNICATION NETWORK SYSTEM FOR DETECT AND WAKE UP A NETWORK NODE THAT DOES NOT PROPERLY RECOGNIZE A WAKE UP FRAME

(71) Applicant: DENSO CORPORATION, Kariya, Aichi-pref. (JP)

(72) Inventors: Tomoko Kodama, Kariya (JP); Tomohisa Kishigami, Obu (JP)

(73) Assignee: DENSO CORPORATION, Kariya (JP)

( * ) Notice: Subject to any disclaimer, the term of this patent is extended or adjusted under 35 U.S.C. 154(b) by 182 days.

(21) Appl. No.: 13/909,322

(22) Filed: Jun. 4, 2013

(65) Prior Publication Data

US 2013/0326255 A1 Dec. 5, 2013

(30) Foreign Application Priority Data

Jun. 5, 2012 (JP) .................................. 2012-128212

(51) Int. Cl.
*G06F 1/32* (2006.01)
*H04L 12/40* (2006.01)

(52) U.S. Cl.
CPC ............ *G06F 1/32* (2013.01); *H04L 12/40039* (2013.01); *H04L 2012/40215* (2013.01)

(58) Field of Classification Search
CPC ................. G06F 1/32; H04J 1/16; H04L 1/08
USPC ................................................. 713/320, 324
See application file for complete search history.

(56) References Cited

U.S. PATENT DOCUMENTS

| 7,539,888 B2* | 5/2009 | Hu et al. ........................ 713/324 |
| 2008/0008103 A1* | 1/2008 | Suzuki et al. ................. 370/250 |
| 2008/0276107 A1* | 11/2008 | Bogavac ....................... 713/323 |

(Continued)

FOREIGN PATENT DOCUMENTS

| JP | 2008-042888 | 2/2008 |
| JP | 2009-296280 | 12/2009 |

(Continued)

OTHER PUBLICATIONS

Office action dated May 20, 2014 in corresponding Japanese Application No. 2012-128212.

*Primary Examiner* — Vincent Tran
(74) *Attorney, Agent, or Firm* — Harness, Dickey & Pierce, PLC (57) ABSTRACT

A communication system includes a plurality of nodes performing communication via a common communication channel based on a communication protocol and including a first node or a second node. The first node transmits, to the communication channel, a wake-up frame as the communication frame for enabling the second node to transition from a sleep state to a normal state, determines whether or not the second node transitions to the normal state due to the wake-up frame, and generates an abnormal waveform pattern in the communication channel when determined that the second node does not transition to the normal state. The second node stores the identification information allocated to the second node, and enables the second node to transition from the sleep state to the normal state under on condition that the identification information included in the wake-up frame received from the communication channel is identical to the stored identification information.

4 Claims, 3 Drawing Sheets

(56) References Cited

U.S. PATENT DOCUMENTS

2012/0051241 A1 3/2012 Mori et al.
2013/0139018 A1* 5/2013 Takada et al. ................ 714/748

FOREIGN PATENT DOCUMENTS

| JP | 2012-054701 | 3/2012 |
|---|---|---|
| JP | 2012-099958 | 5/2012 |

* cited by examiner

FIG.1

COMMUNICATION NETWORK SYSTEM FOR DETECT AND WAKE UP A NETWORK NODE THAT DOES NOT PROPERLY RECOGNIZE A WAKE UP FRAME

CROSS-REFERENCE TO RELATED APPLICATION

This application is based on and claims the benefit of priority from earlier Japanese Patent Application No. 2012-128212 filed Jun. 5, 2012, the description of which is incorporated herein by reference.

BACKGROUND

1. Technical Field

The present invention relates to a communication system, and in particular to a communication technique suitable for a mode in which a plurality of nodes perform communication via a common communication channel.

2. Related Art

In related arts, communication systems are known that have a plurality of nodes performing communication via a common communication channel. As such communication systems, JP-A-2009-296280 discloses a communication system with a configuration in which a plurality of nodes make a transition to a sleep state in order to reduce power consumption.

In this regard, for example, a controller area network (CAN) protocol defines two signal levels on a bus (communication channel), i.e., "dominant" and "recessive" levels. While in a state (bus idle state) where no bus signal is transmitted/received via the bus, the signal level on the bus is kept in keeps the recessive level. When a bus signal of the dominant level is transmitted from a node connected to the bus, the signal level on the bus becomes the "dominant" level.

The conventional CAN protocol (standardized in ISO 11898-5) defines that a node in a sleep state is woken up (i.e., turned into a wake-up state) when the bus signal of the dominant level is received from the bus. Therefore, in a communication system based on the conventional CAN protocol, when any bus signal is transmitted/received via the bus, all the nodes connected to the bus are turned into the wake-up state. In other words, all of the nodes connected to the bus are supposed to perform communication in the wake-up state. This raises a problem that the nodes which do not have to perform communication unnecessarily consume power.

As a measure against this problem, a recent CAN protocol (standardized in ISO 11898-6) defines a selective wake-up function for selectively waking up those nodes which are required to perform communication, among the nodes connected to the bus. The selective wake-up function realizes a partial network that enables communication in a state where a part of the nodes connected to the bus are woken up.

Specifically, a node in a sleep state may be configured to be woken up by receiving a wake-up frame that specifies its own node. However, such a configuration raises a problem that, when, for some reason, a node becomes unable to properly recognize the wake-up frame that specifies the own node, this node can no longer be woken up.

SUMMARY

The present disclosure provides a communication system which is capable of waking up a node that does not properly recognize a wake-up frame.

According to an aspect of the present disclosure, there is provided a communication system, including: a plurality of nodes that performs communication via a common communication channel based on a communication protocol in such a manner that the nodes are woken up, when a communication frame including specified identification information is generated in the communication channel, or when an abnormal waveform pattern, which is a waveform pattern that is not included in a normal communication frame, is generated in the communication channel (9). The nodes includes a first node or a second node.

The first node includes start instructing means, determining means and waveform generating means. The start instructing means transmits, to the communication channel, a wake-up frame including the identification information allocated to the second node, as the communication frame for enabling the second node to make a transition from a sleep state to a normal state. The determining means determines whether or not the second node has made a transition to the normal state due to the wake-up frame transmitted from the start instructing means. The waveform generating means generates the abnormal waveform pattern in the communication channel when the determining means determines that the second node has not made a transition to the normal state, The second node includes storing means and starting means. The storing means stores the identification information allocated to the second node. The starting means enables the second node to make a transition from the sleep state to the normal state on a wake-up condition that the identification information included in the wake-up frame received from the communication channel is identical to the identification information stored in the storing means.

According to such a communication system, the first node is able to specify and wake up the second node, which is a start target, among the plurality of nodes. In particular, in this communication system, an abnormal waveform pattern is permitted to be generated in the communication channel under the condition where the second node, which is a start target, cannot be woken up by the wake-up frame. Thus, the node, which is disabled from properly recognizing the wake-up frame, can be woken up.

The bracketed references in this column and in the claims show correspondency to the specific means described in the embodiment that will be described later as one example, and thus shall not limit the technical scope of the present invention.

DESCRIPTION OF EMBODIMENTS

With reference to the accompanying drawings, hereinafter is described an exemplary embodiment to which the present invention is applied.

1. General Configuration

Figure 1:
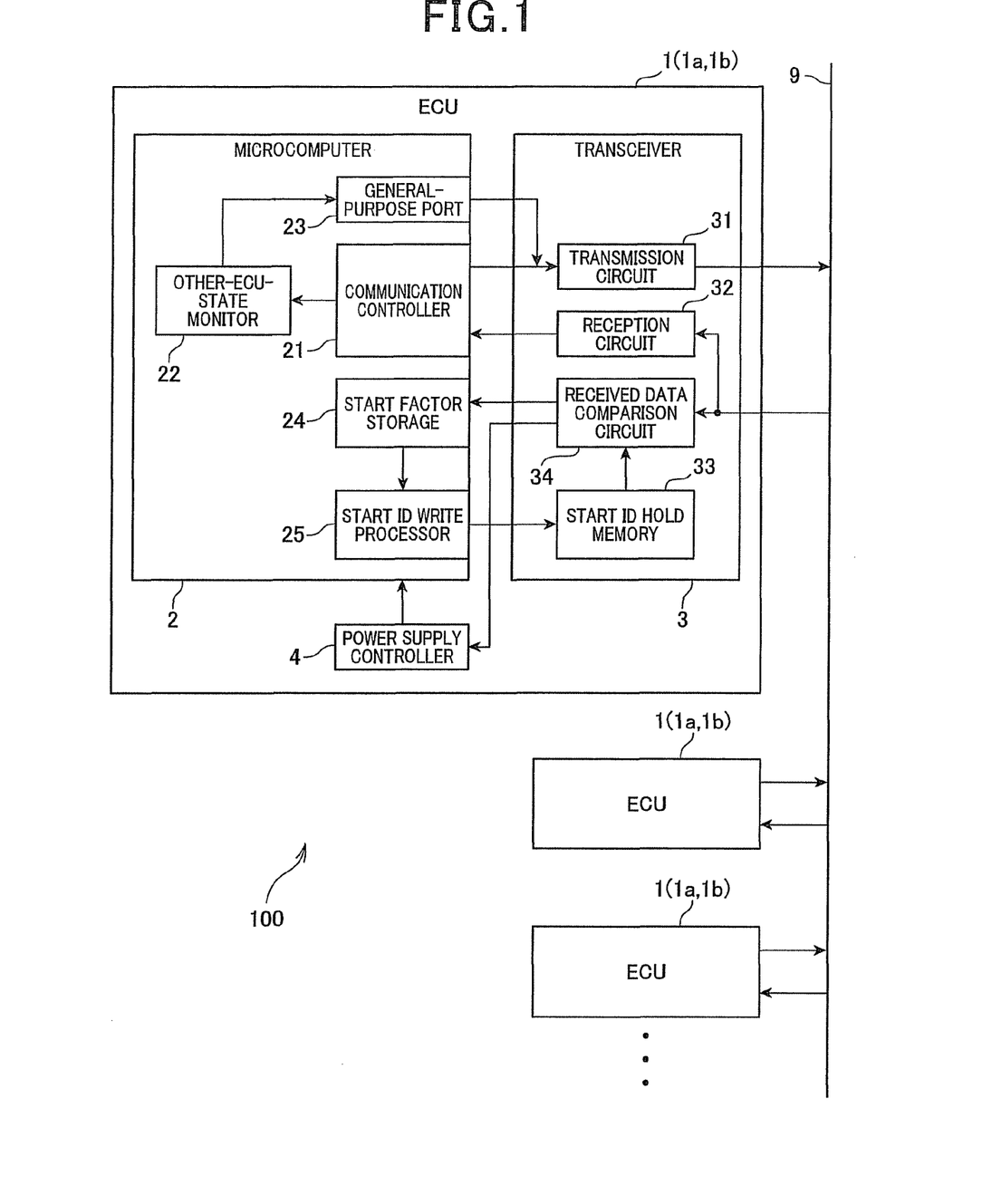
FIG. 1 is a block diagram showing a configuration of a communication system, according to an exemplary embodiment of the present invention.

FIG. 1 shows a communication system 100 according to the present embodiment. This communication system 100 includes a plurality of electronic control units (hereinafter referred to as "ECUs") 1 mounted in a vehicle. The plurality of ECUs 1 are connected to a common bus (communication channel) 9 to configure a network (in-vehicle LAN (local area network)). These ECUs 1 perform intercommunication via the bus 9 according to a CAN (controller area network) protocol. Specifically, in this communication system 100, each of the plurality of ECUs 1 functions as a node (communication device). The ECUs 1 include well-known ECUs with a variety of functions, such as an engine ECU that performs control for an engine of the vehicle, a brake ECU that performs control for a brake of the vehicle, a steering ECU that performs control for a steering of the vehicle, and a suspension ECU that performs control for a suspension of the vehicle.

Each ECU 1 has a plurality of states including a normal state where communication processes are performed and a sleep state where communication processes are stopped to reduce power consumption. The communication system 100 of the present embodiment realizes a partial network. In the partial network, communication is performed in a state where a part of the ECUs 1 connected to the bus 9 are woken up to thereby reduce power consumption of the entire communication system 100.

Specifically, each of the ECUs 1 is allocated with a unique start ID. An ECU 1 functioning as a master node 1*a* transmits a wake-up frame to the bus 9. The wake-up frame includes the start ID of one or more start-target ECUs 1 among the ECUs 1 that function as slave nodes 1*b*. Each ECU 1 functioning as a slave node 1*b* makes a transition to the normal state when the start ID included in the wake-up frame received from the bus 9 is of each own ECU 1 (own node). Thus, the ECU 1 functioning as a master node 1*a* specifies one or more start-target ECUs 1 among the ECUs 1 that function as slave nodes 1*b*, thereby allowing a part of the ECUs 1 to be in the sleep state, while allowing the other ECUs 1 to be in the normal state.

2. Configuration of ECU

Each ECU 1 includes a microcomputer 2, a transceiver 3 and a power supply controller 4. The microcomputer 2 controls the individual components of the vehicle and performs communication with other ECUs 1. The transceiver 3 serves as an interface IC that intermediates between the microcomputer 2 and the bus 9.

The transceiver 3 includes a transmission circuit 31, a reception circuit 32, a start ID hold memory 33 and a received data comparison circuit 34.

The transmission circuit 31 receives a transmission signal (logical value) from the microcomputer 2, converts the transmission signal into a bus signal which is to be transmitted/received via the bus 9, and transmits the converted signal to the bus 9. Specifically, when a (high-level) transmission signal indicating 1 is received from the microcomputer 2, the transmission circuit 31 transmits a bus signal of the recessive level to the bus 9. When a (low-level) transmission signal indicating 0 is inputted from the microcomputer 2, the transmission circuit 31 transmits a bus signal of the dominant level to the bus 9. When a bus signal of the dominant level and a bus signal of the recessive level are concurrently transmitted from a plurality of ECUs 1 connected to the bus 9, the signal level on the bus 9 becomes the dominant level.

The reception circuit 32 receives a bus signal from the bus 9, converts the signal into a reception signal (logical value), and outputs the converted signal to the microcomputer 2. Specifically, when a bus signal of the recessive level is received from the bus 9, the reception circuit 32 outputs a (high-level) reception signal indicating 1 to the microcomputer 2. When a bus signal of the dominant level is received from the bus 9, the reception circuit 32 outputs a (low-level) reception signal indicating 0 to the microcomputer 2.

The start ID hold memory 33 serves as a data-rewritable storage device. The start ID of the own ECU 1 is written into the memory 33 by the microcomputer 2.

The received data comparison circuit 34 compares, bit by bit, the start ID included in the wake-up frame received from the bus 9 with the start ID that has been written into the start ID hold memory 33. When these start IDs are identical with each other, the received data comparison circuit 34 outputs a power supply signal so that the power supply controller 4 can deliver power to the microcomputer 2. Thus, as will be described later, the own ECU 1 makes a transition from the sleep state to the normal state.

The microcomputer 2 has a well-known configuration composed of a central processing unit (CPU), a read only memory (ROM), a random access memory (RAM), an input/output (IO) port, and the like (not shown). In addition to these components, the microcomputer 2 includes a communication controller 21, an other-ECU-state monitor 22, a general-purpose port 23, a start factor storage 24 and a start ID write processor 25.

The communication controller 21 performs communication processes (e.g., transmission/reception of frame, arbitration control and communication error processing) according to the CAN protocol. The communication controller 21 outputs a low- or high-level transmission signal to the transceiver 3. Also, the communication controller 21 receives a low- or high-level reception signal from the transceiver 3, which is indicative of the contents of the bus signal received from the bus 9.

The other-ECU-state monitor 22 performs a process of monitoring the states of other ECUs 1. In the communication system 100 of the present embodiment, each ECU 1 in the normal state periodically transmits a network management frame (hereinafter referred to as "NM frame") including information that can identify the ECU 1 as a sender. Therefore, the other-ECU-state monitor 22 is able to monitor the states of other ECUs 1 (whether they are in the normal state) on the basis of the receptions of the NM frames.

The start factor storage 24 stores the factor (cause) by which the ECU 1 has been woken up (hereinafter referred to as "start factor (start or startup cause)") on the basis of the results of the comparison made by the received data comparison circuit 34.

The start ID write processor 25 performs a process of writing the start ID of the ECU 1 stored in the ROM in advance into the start ID hold memory 33. Also, as will be described later, the start ID write processor 25 outputs to the transceiver 3 an instruction for switching the operation mode of the transceiver 3.

The microcomputer 2 includes a clock circuit (not shown) that generates an operation clock for the operation of the CPU. When power delivery to the clock circuit is stopped, the operation of the clock circuit (and the operation of the CPU as well) is stopped. The normal state mentioned above refers to a state where the clock circuit of the microcomputer 2 is in operation. Also, the sleep state refers to a state where the operation of the clock circuit of the microcomputer 2 is stopped.

The power supply controller 4 controls power delivery to the microcomputer 2. When power delivery to the microcomputer 2 is stopped, the operation mode of the ECU 1 transitions to the sleep state. When power delivery to the microcomputer 2 is started, the operation mode of the ECU 1 transitions to the normal state (the ECU 1 is woken up).

3. Processes

In each ECU 1 configured as described above, in the event the start ID stored in the start ID hold memory 33 turns to an erroneous value or is deleted, for example, for some reason, the wake-up frame, with which one or more start-target ECUs 1 can no longer be properly recognized. In this case, the master node is disabled from waking up the start-target ECUs 1. Being prepared for such a situation, the communication system 100 of the present embodiment is configured such that a process of forcibly waking up each ECU 1 can be performed.

Hereinafter are described the processes performed in each ECU 1. First, referring to the flow diagram shown in FIG. 2, a series of steps of a master process is described. The mater process is performed by the microcomputer 2 of the ECU 1 that functions as a master node 1a.

Figure 2:
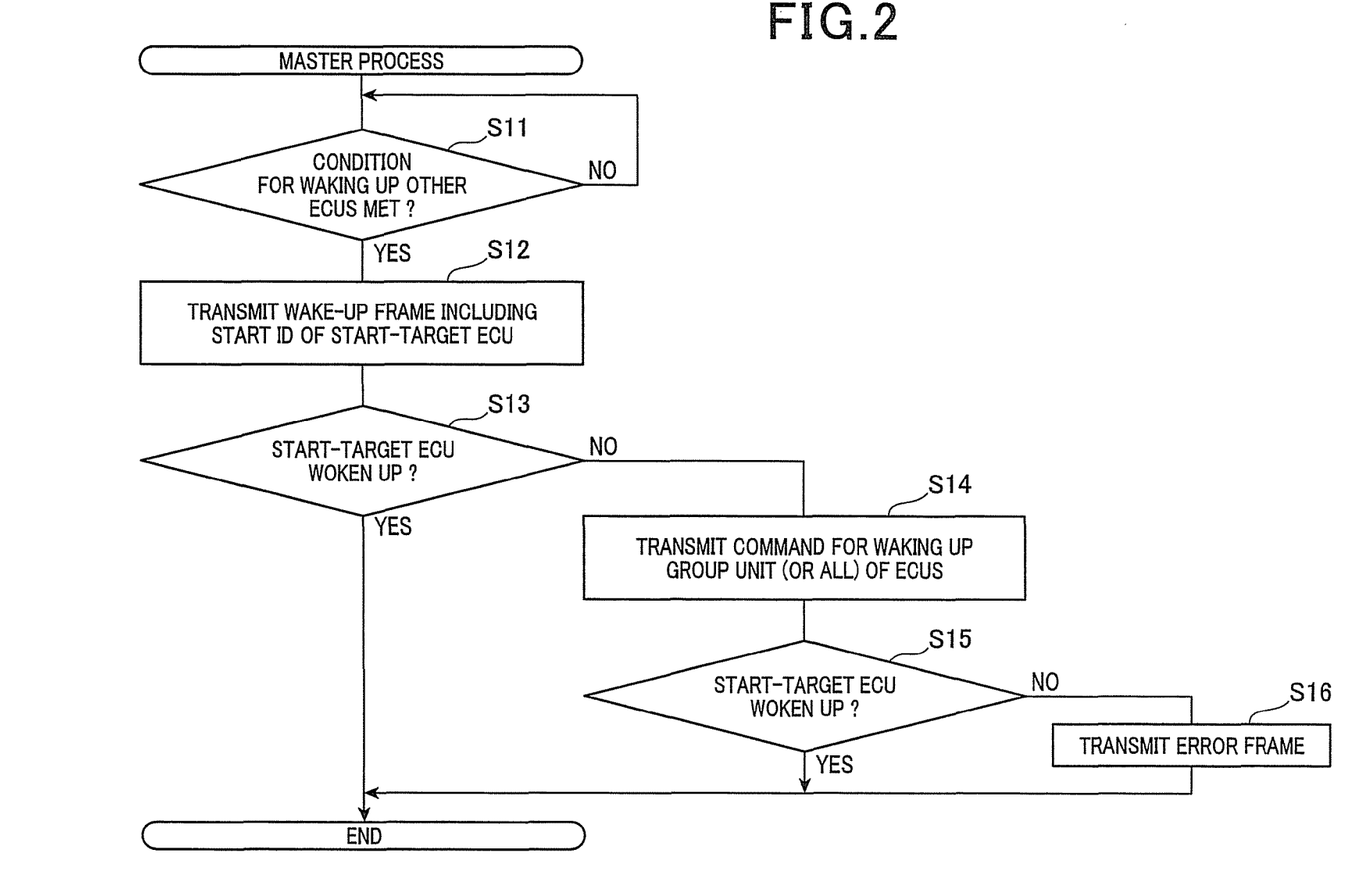
FIG. 2 is a flow diagram showing a master process.

When the master process is started, the microcomputer 2 stands by until the conditions for waking up other ECUs 1 are met (NO at step S11). When the conditions are met (YES at step S11), the microcomputer 2 transmits a wake-up frame (normal wake-up frame) that includes a start ID of each start-target ECU 1 (step S12).

Then, the microcomputer 2 determines whether or not each start-target ECU 1 has been woken up by the wake-up frame transmitted at step S12 (step S13). As mentioned above, each ECU 1 in the normal state periodically transmits an NM frame. Therefore, the microcomputer 2 is able to determine whether or not each start-target ECU 1 has been woken up, based on whether or not an NM frame has been received from each start-target ECU 1 within a predetermined period.

When the microcomputer 2 determines that each start-target ECU 1 has been woken up (YES at step S13), the master process shown in FIG. 2 is immediately ended.

On the other hand, when the microcomputer 2 determines that each start-target ECU 1 has not yet been woken up (NO at step S13), the microcomputer 2 performs a process of transmitting a command (group-unit wake-up frame) (step S14). With this command, a plurality of ECUs 1 (group-unit ECUs 1) including each started target ECU 1 can be woken up at a time. This command is used for waking up, at a time, a plurality of ECUs 1 that configure a specified group. For example, the start ID included in the wake-up frame mentioned above may be partially masked to indicate a value common to the plurality of ECUs 1, and the partially masked wake-up frame may be transmitted. Alternatively, a dedicated frame different from the wake-up frame may be transmitted. Instead of the command for waking up the ECUs 1 with a group unit, the microcomputer 2 may transmit a command that wakes up all the ECUs 1 connected to the bus 9.

Then, the microcomputer 2 determines whether or not each start-target ECU ECU 1 has been woken up by the wake-up frame transmitted at step S14 (step S15). When the microcomputer 2 determines that each start target ECU 1 has been woken up (YES at step S15), the master process shown in FIG. 2 is ended.

On the other hand, if the microcomputer 2 determines, at step S15, that each start-target ECU 1 has not yet been woken up (NO at step S15), the microcomputer 2 performs a process of transmitting an error frame (forcible wake-up frame) (step S16). Then, the master process shown in FIG. 2 is ended.

Specifically, the CAN protocol specifies that, when a waveform pattern not included in a proper communication frame (abnormal waveform pattern) is generated in the bus 9, all the nodes (ECUs 1) connected to the bus 9 are ensured to be woken up in an error mode, as a failsafe function.

In the communication system 100 of the present embodiment, attention is focused on this function. Specifically, if the wake-up by the wake-up frame ends in failure, the bus 9 is permitted, by design, to generate an abnormal waveform pattern (trigger, wakeup, or special waveform pattern) to thereby forcibly wake up the ECUs 1 with an error mode. More specifically, the communication controller 21 is configured to perform the communication processes according to the CAN protocol and accordingly cannot generate an abnormal waveform pattern by design.

Therefore, the microcomputer 2 repeatedly transmits, as an error frame defined in the CAN protocol, a six consecutive bits of the dominant level (corresponding to an error flag included in the error frame), for thirty-two times, from the general-purpose port 23. Thus, the bus 9 is permitted to generate an abnormal waveform pattern. As a result, all the ECUs 1 connected to the bus 9 can be forcibly woken up.

Figure 3:
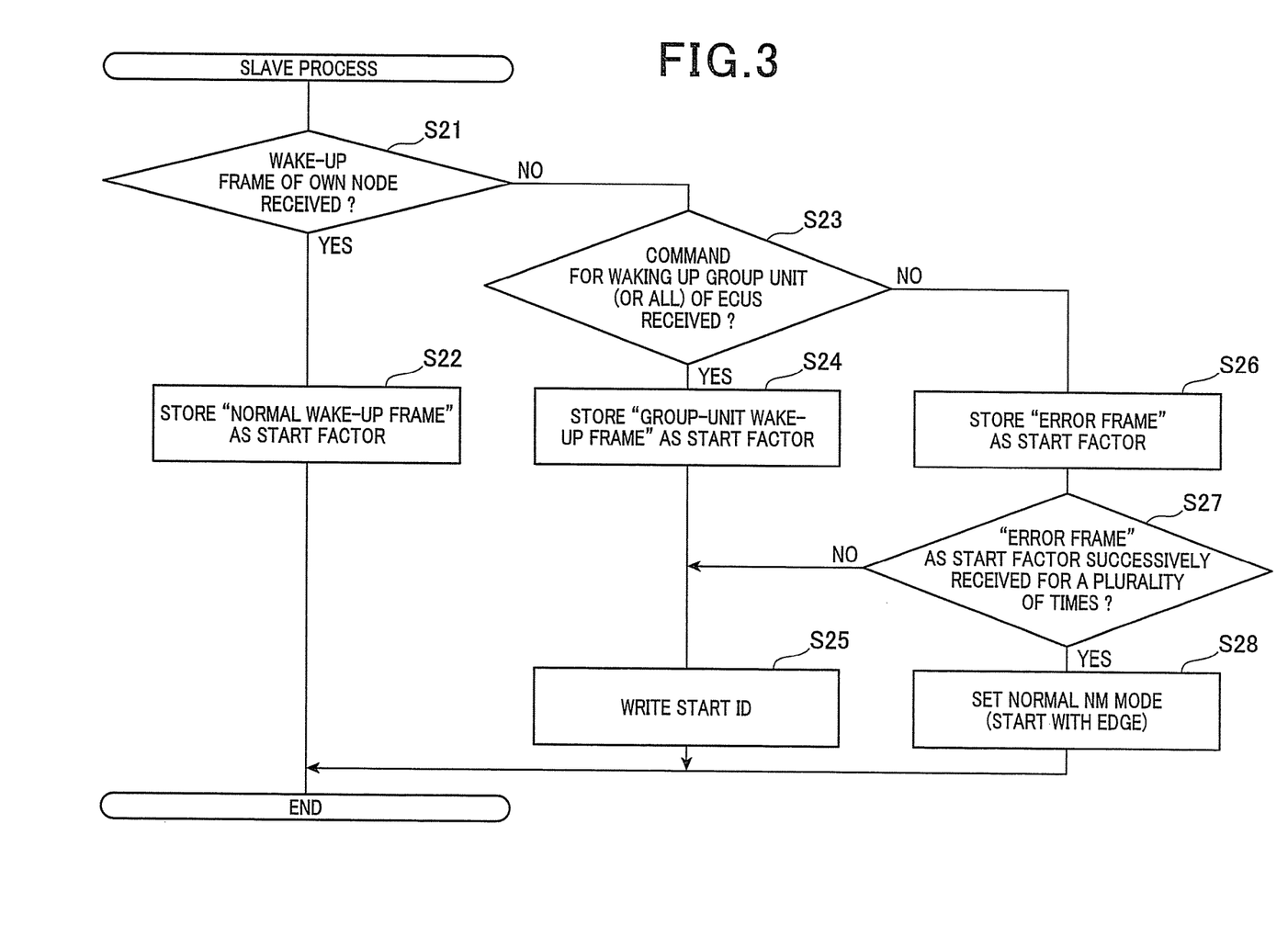
FIG. 3 is a flow diagram showing a slave process.

Referring to the flow diagram shown in FIG. 3, hereinafter is described a slave process which is performed by the microcomputer 2 of an ECU 1 functioning as a slave node 1b. The microcomputer 2 starts the slave process, taking the opportunity when own ECU 1 (own node) has transitioned from the sleep state to the normal state.

The microcomputer 2 determines whether or not the start factor, by which the own ECU 1 has transitioned to the normal state, is the reception of the wake-up frame (own-node wake-up frame) transmitted to the own ECU 1 as a start target (step S21). The determination is made on the basis of the results of the comparison made by the received data comparison circuit 34. If the microcomputer 2 determines that the start factor is the reception of the wake-up frame transmitted to the own ECU 1 as a start target (YES at step S21), the microcomputer 2 stores in the start factor storage 24 the information indicating that the start factor is the "normal wake-up frame" (step S22). After that, the microcomputer 2 puts an end to the slave process shown in FIG. 3.

On the other hand, if the microcomputer 2 determines that the start factor is not the reception of the wake-up frame transmitted to the own ECU 1 as a start target (NO at step S21), control proceeds to step S23. At step S23, the microcomputer 2 determines whether or not the start factor is the reception of the command for waking up a group-unit (or all of) ECUs 1 (step S23). If the microcomputer 2 determines that the start factor is the reception of the command (YES at step S23), the microcomputer 2 stores in the start factor storage 24 the information indicating that the start factor is the "group-unit wake-up frame" (step S24). Then, the microcomputer 2 performs a process of writing the start ID stored in the ROM into the start ID hold memory 33 (step S25) and ends the slave process shown in FIG. 3. In other words, if the own ECU 1 is not started with the normal wake-up frame, there is a high probability that the start ID stored in the start ID hold memory 33 does not have a proper value. Therefore, the microcomputer 2 performs a process of updating the start ID so as to have a proper value.

On the other hand, if the microcomputer 2 determines, at step S23, that the start factor is not the reception of the command for waking up a group-unit (or all of) ECUs 1 (NO at step S23), control proceeds to step S26. At step S26, the microcomputer 2 stores in the start factor storage 24 the information indicating that the start factor is an error frame (step S26). Then, the microcomputer 2 determines whether or not the wake-up with the "error frame" as a start factor has been successively performed for a plurality of times (preset number of times) (step S27).

If the microcomputer 2 determines, at step S27, that the wake-up with the "error frame" as a start factor has not been successively performed for a plurality of times (NO at step S27), control proceeds to step S25. Then, as mentioned above, the microcomputer 2 performs the process of writing the start ID stored in the ROM into the start ID hold memory 33 (step S25). Then, the microcomputer 2 ends the slave process shown in FIG. 3.

On the other hand, if the microcomputer 2 determines, at step S27, that the wake-up with the "error frame" as a start factor has been successively performed for a plurality of times (YES at step S27), control proceeds to step S28. Then, the microcomputer 2 allows the operation mode of the transceiver 3 to transition from the partial start mode with which the ECU 1 is started by a wake-up frame, to the normal NM mode with which the ECU 1 is started by the change (edge) of the signal level on the bus 9 (step S28). Then, the slave process shown in FIG. 3 is ended.

Specifically, the transceiver 3 of the present embodiment is configured to enable switching between a limited start mode and the normal NM mode. In the limited start mode, the microcomputer 2 is started when the ECU 1 receives a wake-up instruction transmitted to the own ECU 1 as a start target. In the normal NM mode, the microcomputer 2 is started when the ECU 1 receives a bus signal of the dominant level from the bus 9 (when the dominant level continues for a predetermined period or more). In the limited start mode, the transceiver 3 allows the power supply controller 4 to start power delivery, as mentioned above, to the microcomputer 2 when the ECU 1 in the sleep state receives either the wake-up frame transmitted to the ECU 1 as a start target, or the command for waking up a group-unit (or all of) ECUs 1 including the ECU 1. In contrast, in the normal NM mode, the transceiver 3 allows the power supply controller 4 to start power delivery to the microcomputer 2 when the ECU 1 in the sleep state detects a bus signal of the dominant level. In other words, when the wake-up with the error frame as a start factor is successively performed for a plurality of times, the operation mode of the transceiver 3 is permitted to transition to the normal NM mode, so that an error may less frequently occur.

(Effects)

As described above, in the communication system 100 of the present embodiment, the ECU 1 functioning as a master node 1a transmits a wake-up frame to the bus 9 (step S12). The wake-up frame includes a start ID which is allocated to a start-target ECU 1 among the ECUs 1 functioning as slave nodes 1b. Then, it is determined whether or not the start-target ECU 1 has transitioned to the normal state (step S13). If a negative determination is made (NO at step S13), the ECU 1 functioning as the master node 1a transmits an error frame to the bus 9 (step S16). The error frame permits the bus 9 to generate an abnormal waveform pattern.

On the other hand, in each ECU 1 functioning as the slave node 1b, the start ID allocated to the ECU 1 is stored in the start ID hold memory 33 of the transceiver 3. The ECU 1 transitions from the sleep state to the normal state under the wake-up condition that the start ID included in the wake-up frame received via the bus 9 is identical with the start ID that has been stored in the start ID hold memory 33.

According to such a communication system 100, the ECU 1 functioning as a master node 1a is able to specify and wake up a start-target ECU 1 among the plurality of ECUs 1 functioning as slave nodes 1b. In this connection, the transceiver 3 is mass-produced as a general-purpose circuit. Therefore, if a start ID unique to an individual ECU 1 is attempted to be stored in the ECU 1 in the process of the production, the productivity is drastically lowered. In this regard, the start ID hold memory 33 provided in the transceiver 3 of the present embodiment serves as a data-rewritable storage device. Thus, since a start ID is written by the microcomputer 2, a start ID unique to an individual ECU 1 is not required to be stored in the ECU 1 in the process of the production. Accordingly, the communication system 100 that can specify and wake up a start-target ECU 1 can be realized using the general-purpose transceiver 3.

In particular, the communication system 100 of the present embodiment transmits an error frame to the bus 9 under the condition where the start-target ECU 1 cannot be woken up by the wake-up frame, thereby permitting the communication channel to generate an abnormal waveform pattern. Therefore, the ECU 1 in a state of being unable to properly recognize the wake-up frame can be woken up by an error mode.

The communication system 100 of the present embodiment updates the start ID stored in the start ID hold memory 33 when the ECU 1 that functions as a slave node 1b has transitioned to the normal state by a waveform pattern other than the wake-up frame which is transmitted to the ECU 1 as a start target (i.e. the wake-up frame that includes the start ID allocated to the ECU 1) (step S25). Accordingly, in the event that the start ID stored in the start ID hold memory 33 turns to an erroneous value or is deleted, for example, for some reason, the start ID can be restored to a proper start ID.

Further, the communication system 100 of the present embodiment switches the wake-up conditions to the ones that do not make use of the start ID stored in the start ID hold memory 33 under the condition that: the ECU 1 that functions as a slave node 1b has made a transition to the normal state with an error frame as a start factor; and that the transition caused by this start factor is successively made for a predetermined number of times (step S28). Accordingly, the error frame is suppressed from being frequently outputted on the occurrence of an abnormal state (e.g., an abnormal state where a proper value cannot be written into the start ID hold memory 33, or an abnormal state caused in the received data comparison circuit 34) which is not resolved by the update of the start ID stored in the start ID hold memory 33.

The communication system 100 of the present embodiment transmits a communication frame to the bus 9 so that a plurality of ECUs 1 that includes one or more start-target ECUs 1 can be woken up at a time, as a pre-stage of transmitting an error frame (step S14). The communication frame is transmitted under the condition that the ECU 1 functioning as a master node determines that each start-target ECU 1 has not yet made a transition to the normal state due to the wake-up frame. Accordingly, the frequency of causing an error is reduced compared to the case where an error frame is immediately transmitted when each start-target ECU cannot be woken up due to a normal wake-up frame.

In the present embodiment, the ECU 1 corresponds to an example of a node. In particular, the ECU 1 that functions as a master node 1a and a slave node 1b correspond to an example of the first node and the second node, respectively. Further, the bus 9 corresponds to an example of the communication channel. The power supply controller 4 and the received data comparison circuit 34 correspond to an example of the starting means of the second node, and the start ID hold memory 33 corresponds to an example of the storing means of the second node. The start ID corresponds to an example of the identification information. Steps S12, S13, S14, S16, S25 and S28 correspond to an example of the processing as the start instructing means, the determining means, the reinstructing means, and the waveform generating means of the first node, and the updating means and the switching means of the second node, respectively.

[Modifications]

An embodiment of the present embodiment has been described so far. However, the present invention is not limited to the embodiment described above but, as a matter of course, may be implemented in various modes.

In the above embodiment, the start ID stored in the start ID hold memory 33 is ensured to be updated when the ECU 1 does not make a transition to the normal state in spite of being received with a wake-up frame that includes the start ID of the own ECU 1 from the bus 9. However, this shall not impose a limitation. For example, a proper transition of an ECU 1 may be achieved through the transition from the sleep state to the normal state via a listen state (listening state), followed by the transition from the normal state to the sleep state. In such a case, the start ID stored in the start ID hold memory 33 may be updated when the microcomputer 2 determines that the ECU 1 has made a transition to the sleep state without transitioning to the normal state.

In the above embodiment, the start ID stored in the ROM of the microcomputer 2 is ensured to be written into the start ID hold memory 33. However, this shall not impose a limitation. For example, the start ID received from a different ECU 1 may be written into the start ID hold memory 33. In other words, an ECU 1 may update the start ID of the own ECU 1 to the start ID received from a different ECU 1. In this case, the transmission-side ECU 1 may transmit a rewrite instruction frame that includes a plurality of identical start IDs (e.g., eight start IDs having 1-byte). Then, in response to the transmission, the reception-side ECU 1 may write the start ID into the start ID hold memory 33 if all of the plurality of start IDs included in the write instruction frame are identical. Thus, a start ID, which is not proper, is prevented from being written into the start ID hold memory 33.

In the above embodiment, the operation mode of the transceiver 3 is ensured to make a transition to the normal NM mode when the wake-up with the "error frame" as a start factor is successively performed for a plurality of times. However, this shall not impose a limitation. For example, the operation mode of the transceiver 3 may be switched upon reception of an instruction from a different ECU 1.

In the above embodiment, an on-vehicle communication system based on the CAN protocol is exemplified. However, this shall not impose a limitation. The present invention may be applied to a communication system based on a different communication protocol, for example, according to CSMA/CD (carrier sense multiple access with collision detection) access method.

In the above embodiment, as shown in FIG. 1, the start ID hold memory 33 and the received data comparison circuit 34 are arranged in the transceiver 3. Alternative to this, the start ID hold memory 33 and the received data comparison circuit 34 may be arranged in the communication controller 21. In this case, only a part of the microcomputer 2, which is relevant to the operation of the communication controller, may be started to make a determination as to whether or not the communication frame is the one that includes identification information.

What is claimed is:

1. A communication system comprising:
   a plurality of nodes that perform communication via a common communication channel based on a communication protocol in such a manner that the nodes are woken up, when a communication frame including specified identification information is generated in the communication channel, or when an abnormal waveform pattern, which is a waveform pattern that is not included in a normal communication frame, is generated in the communication channel, wherein:
   the nodes are divided into a first node and a second node;
   the first node includes:
      start instructing means for transmitting, to the communication channel, a wake-up frame including the identification information allocated to the second node, as the communication frame for enabling the second node to make a transition from a sleep state to a normal state;
      determining means for determining whether or not the second node has made a transition to the normal state due to the wake-up frame transmitted from the start instructing means;
      waveform generating means for generating the abnormal waveform pattern in the communication channel when the determining means determines that the second node has not made a transition to the normal state; and
      reinstructing means for transmitting, to the communication channel, the communication frame for enabling the plurality of nodes including the second node to wake up at a time, before the waveform generating means generates the abnormal waveform pattern, when the determining means determines that the second node has not transitioned to the normal state; and
   the second node includes:
      storing means for storing the identification information allocated to the second node; and
      starting means for enabling the second node to make a transition from the sleep state to the normal state on a wake-up condition that the identification information included in the wake-up frame received from the communication channel is identical to the identification information stored in the storing means.

2. The communication system according to claim 1, wherein the second node further includes
   updating means for updating the identification information stored in the storing means when it is determined that the second node has made a transition to the normal state due to a waveform pattern other than the wake-up frame including the identification information allocated to the second node.

3. The communication system according to claim 1, wherein the second node further includes
   switching means for switching the wake-up condition to a condition for enabling the second node to be woken up without using the identification information stored in the storing means, when: the second node makes a transition to the normal state due to a factor caused by the abnormal waveform pattern; and the transition due to the factor is successively made for a predetermined number of times.

4. The communication system according to claim 2, wherein the second node further includes
   switching means for switching the wake-up condition to a condition for enabling the second node to be woken up without using the identification information stored in the storing means, when: the second node makes a transition to the normal state due to a factor caused by the abnormal waveform pattern; and the transition due to the factor is successively made for a predetermined number of times.

* * * * *

UNITED STATES PATENT AND TRADEMARK OFFICE
CERTIFICATE OF CORRECTION

| | | |
|---|---|---|
| PATENT NO. | : 9,081,565 B2 | Page 1 of 1 |
| APPLICATION NO. | : 13/909322 | |
| DATED | : July 14, 2015 | |
| INVENTOR(S) | : Tomoko Kodama et al. | |

It is certified that error appears in the above-identified patent and that said Letters Patent is hereby corrected as shown below:

Title Page, Item (54) and in the Specification, Column 1, lines 1-4,

In the title, "COMMUNICATION NETWORK SYSTEM FOR DETECT AND WAKE UP A NETWORK NODE THAT DOES NOT PROPERLY RECOGNIZE A WAKE UP FRAME" should be -- COMMUNICATION NETWORK SYSTEM FOR DETECTING AND WAKING UP A NETWORK NODE THAT DOES NOT PROPERLY RECOGNIZE A WAKE UP FRAME --.

Signed and Sealed this
Eighth Day of March, 2016

Michelle K. Lee
*Director of the United States Patent and Trademark Office*